April 14, 1959  F. K. H. NALLINGER  2,881,871
BRAKING DEVICE PARTICULARLY FOR MOTOR VEHICLES
Original Filed Dec. 20, 1950
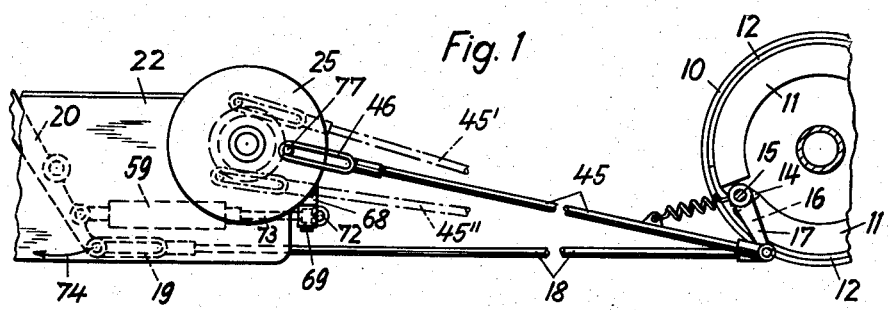
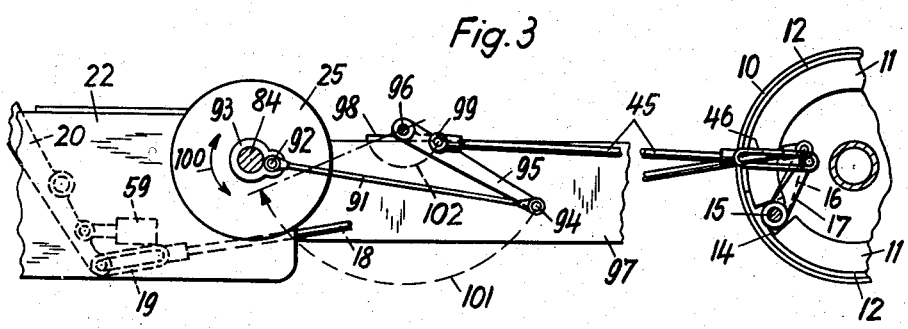
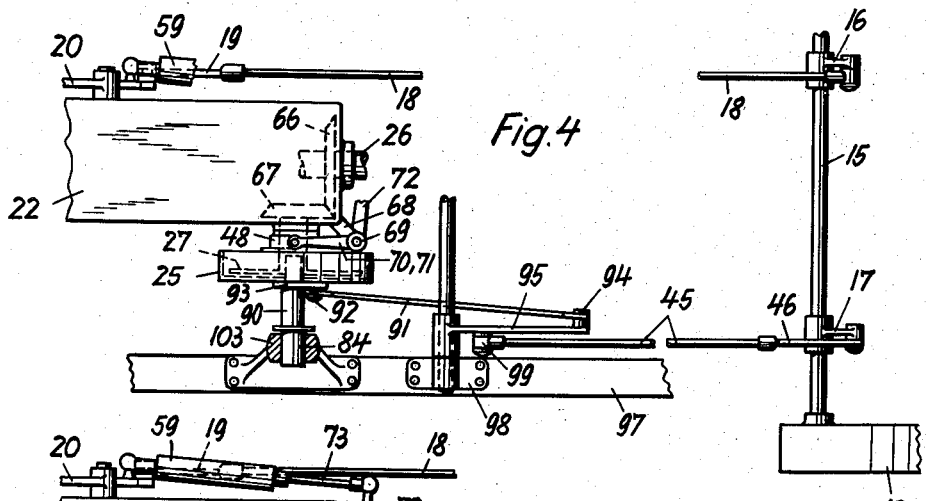
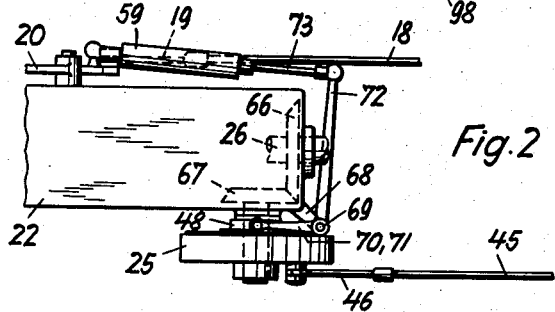

United States Patent Office 2,881,871
Patented Apr. 14, 1959

2,881,871
BRAKING DEVICE PARTICULARLY FOR MOTOR VEHICLES

Friedrich K. H. Nallinger, Stuttgart, Germany, assignor to Daimler-Benz Aktiengesellschaft, Stuttgart-Unterturkheim, Germany Original application December 20, 1950, Serial No. 201,808, now Patent No. 2,700,438, dated January 25, 1955. Divided and this application August 24, 1954, Serial No. 451,745

Claims priority, application Germany December 17, 1949

5 Claims. (Cl. 188—106)

This invention relates to a braking device particularly for motor vehicles and more particularly to a form of braking device in which a principally mechanical braking force energizer is employed and is a division of my application Serial No. 201,808 filed December 20, 1950, now Patent No. 2,700,438.

An object of the invention is to provide a braking device that renders it possible to obtain an increase in brake actuating force in an especially effective manner principally also for heavy vehicles with large masses to be retarded. Another object of the invention is to provide such a construction for the braking force energizer and brake operating device that the possibility of safe brake operation is also given in the event of energizer failure.

A further object of the invention is to make such a device also utilizable for hand brakes. This was, up till now, considered to be superfluous because the hand brake is usually applied only when the car is left standing and the demands on the construction of its linkage or brake connections make the mounting of a mechanically operated device for energizing the braking force quite difficult. However, experience has proven in the operation of heavy vehicles with correspondingly large proportioned brakes, for example, omnibusses, that in the event of malfunction of their foot brakes frequently it has not been possible to bring the vehicle to a stop within a sufficiently short time solely with the hand brake, because the physical strength of the operator does not suffice to produce, with direct force transmission from hand-brake lever to the brake shaft, a moment on the latter corresponding to the full capacity of the brakes.

Accordingly, another object of the invention is to provide such brake actuating whereby normally, while cutting out direct brake operation by means of the operating device, for example, a hand lever, the brake is applied by the energizer, however, means being provided also at the same time for actuating the brake directly by means of the operating device while by-passing the energizer.

Consequently an object of the invention consists principally in certain details of construction providing for a combination of the following features:

(a) The brake operating member, for example, a hand-brake lever is connected directly with the brake or brakes by means of preferably mechanical transmission means which comprise a free-motion device e.g. in the form of a slotted-link so as to permit other brake operation.

(b) The brake actuating member is connected with the device for engaging the energizer or servo-motor by means of preferably mechanical transmission means appropriately adapted to be yielding by employing a spring under initial tension by means of a stop.

(c) The driven part of the braking force energizer is connected with the brake or brakes by means of preferably mechanical transmission means comprising a free-motion device e.g. in the form of a slotted-link permitting direct actuating of the brake or brakes.

Other objects and advantages of the invention will be brought out during the following description of several embodiments of the invention which have been chosen to illustrate the features, principles and advantages thereof.

Referring to the drawings:

Fig. 1 is an illustration of a brake system showing the parts in side view.

Fig. 2 is a top plan view of part of Fig. 1.

Fig. 3 is a side view of the brake system according to a second embodiment of the invention, and Fig. 4 is a plan view of the brake system shown in Fig. 3.

In the embodiment shown in Figs. 1 and 2 the energizer 25 is arranged on the side of the transmission housing 22 with its axis transverse to the drive shaft 26. In the present case it is driven by a pair of bevel gears 66, 67 arranged in a dust-tight manner inside a suitably enlarged transmission housing. The additional cost resulting from this is more than compensated for by a considerable simplification of the transmission means requisite for transmitting the control force and transferring the brake actuating moment to the energizer. A vertically disposed control shaft 69 is supported in a supporting bracket 68 cast integral with the transmission housing 22. A pair of vertically spaced levers 70, 71, embracing the thrust collar 48 like a yoke and articulated to the same, and a lever 72 situated transverse thereto are fastened on the control shaft 69. The free end of the lever 72 is articulated to the lower end of the hand-brake lever 20 by means of a linkage 73 which is likewise provided with a force limiter 59. This limiter comprises a cylinder in which a piston is pressed against the cylinder top by means of a spring under initial tension so long as no external forces exceeding the spring force act upon it. The hand-brake lever 20 is fulcrumed to the transmission housing 22 and on its lower end articulated to the lever 16 by means of a pull rod 18 having a slotted-link 19. By moving the lower end of the hand-brake lever in the direction of the arrow 74, the wheel brakes 10, 11, 12 may be applied directly by hand via the pull rod 18, when the energizer 25 is inoperative as, for example, when the car is not in motion. In the contrary case the energizer is actuated by the transmission members 70 to 73 as the hand-brake lever is moved in the indicated direction. The brake actuating moment produced on the same is, in both directions of rotation, transmitted to the brake shaft 15 by means of the pull rod 45 and lever 17. The juxtaposed levers 16 and 17 are so fastened on the brake shaft 15 that they cover one another in the side view according to Fig. 1 and therefore they are not shown separately. The pull rod 45 is connected by means of a slotted-link 46 to a pin 77 arranged on the energizer 25, whereby also on this point the possibility for an unhindered further actuation of the brakes is assured in case of energizer failure.

Figs. 3 and 4 show an embodiment of this invention which with reference to arrangement and actuation of the energizer is in all details equivalent to that shown in Figs. 1 and 2 in which, however, differing therefrom further provisions have been made so as to obtain an especially great multiplication of force and travel while transmitting the brake actuating movement from the energizer 25 to the brake shaft 15. In order to accomplish this a cable winding device 90 for a wire rope 91 is arranged on the driven shaft 84 of the energizer. The wire rope is articulated with its one end at 92 to a flange 93 of the cable winding device and with its other end at 94 to the free end of a relatively long intermediate lever 95. The latter is arranged on a transverse shaft 96 which is rotatably supported in bearing brackets 98 secured to the vehicle frame 97. Moreover, to the lever 95, relatively slightly removed from its fulcrum point at 99, is linked a pull rod 45 leading to the brake actuating lever 17 and being provided with a slotted-link 46 for previously described reasons.

When by applying the hand-brake lever 20 the energizer 25 is engaged via the limiter 59 and the levers 70 to 72, the wire rope 91 is wound onto the winding device 90 irrespective of the direction of rotation (double arrow 100) of the driven shaft 84 of the energizer. At the same time the articulated points 94, 99 of the wire rope and pull rod on the lever 95 rotate in the direction of the arrows 101, 102. To accomplish this several revolutions of the driven shaft 84 of the energizer are requisite, whereas on the other hand it is only necessary to turn the brake actuating lever 17 by means of the pull rod 45 about a relatively small angle in order to force the brake shoes 11 against the brake drum 10. Consequently, in the present instance an especially great brake actuating moment is exerted upon the shaft 15 by the energizer 25. For a better reception of the transverse force being effective at the same time upon the driven shaft 84 of the energizer said shaft is once more supported at its end at 103. The hand lever 20 is connected directly with the brake shaft 15 by means of a second brake actuating lever 16 and a pull rod 18 engaging both levers and being provided with a slotted-link 19.

The invention is not limited or restricted to the specific embodiments illustrated and described herein but may be varied within the scope of the individual inventive concepts.

What is claimed is:

1. A device for operating an emergency brake, particularly in a motor vehicle, comprising, a hand-operated lever, a brake system, a first connection system directly coupling said lever to said brake system, a friction clutch having driving and driven portions, a second connection system coupled to the driving portion of said friction clutch and to said lever for the control of said clutch, the first connection system defining a longitudinal opening and pivotally engaging the hand-operated lever by means of said longitudinal opening, a thrust limiter in the second connection system, a shaft supporting said friction clutch, a third connection system connecting the driven portion of said clutch to the brake system, said third connection system being pivotally mounted at a neutral point on the driven portion of the friction clutch so that any movement of the driven portion of the clutch will produce the same movement of the third connection system.

2. A device as claimed in claim 1 comprising a lever in said third connection system, the latter said lever including opposite ends and being coupled by one of said ends to the neutral point on the driven portion of the friction clutch and by the other end to the vehicle, said lever constituting a power boost mechanism.

3. A device as claimed in claim 2 comprising a flexible member in said third connection system, said flexible member being coupled to the neutral point on the driven member of the friction clutch and to the latter said lever so that any movement of the driven member of the friction clutch produces the same movement of the third rod system.

4. A device as claimed in claim 3 wherein said flexible member is a cable.

5. A device as claimed in claim 1 wherein said third connection system comprises a rod which includes two ends one of which defines a longitudinal opening for coupling to the neutral point on the driven member of the friction clutch, the other end being coupled to the brake system so that any movement of the driven clutch member produces the same movement of the third connection system.

References Cited in the file of this patent

UNITED STATES PATENTS

| | | |
|---|---|---|
| Re. 17,687 | Collins | June 3, 1930 |
| 930,234 | Rudolph | Aug. 3, 1909 |
| 1,058,336 | Rudolph | Apr. 8, 1913 |
| 1,895,451 | Dormoy | Jan. 31, 1933 |
| 1,998,918 | Apple et al. | Apr. 23, 1935 |
| 2,001,229 | Ware | May 14, 1935 |

FOREIGN PATENTS

| | | |
|---|---|---|
| 689,070 | Great Britain | Mar. 18, 1953 |